(12) United States Patent
Horiuchi

(10) Patent No.: US 8,031,585 B2
(45) Date of Patent: Oct. 4, 2011

(54) COMMUNICATION APPARATUS

(75) Inventor: Kazuhisa Horiuchi, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 154 days.

(21) Appl. No.: 12/466,825

(22) Filed: May 15, 2009

(65) Prior Publication Data
US 2009/0296586 A1    Dec. 3, 2009

(30) Foreign Application Priority Data

May 30, 2008    (JP) ................................ 2008-143005

(51) Int. Cl.
*H04J 11/00*    (2006.01)
(52) U.S. Cl. ...................................................... 370/208
(58) Field of Classification Search .................. 370/203, 370/208; 375/267, 347, 299; 455/103, 101
See application file for complete search history.

(56) References Cited

U.S. PATENT DOCUMENTS

2007/0291638 A1 * 12/2007 Chae et al. ..................... 370/208

OTHER PUBLICATIONS

Siavash M. Alamouti, "A Simple Transmit Diversity Technique for Wireless Communications", IEEE Journal on Select Areas in Communications, vol. 16, No. 8, Oct. 1998, pp. 1451 to 1458.
Fu Hong-Liang, et al., "Cyclic Space—Time Block Codes and Decoding Algorithm in MIMO CDMA System", IEEE Wireless Communications, Networking and Mobile Computing 2006, International Conference on WiCOM 2006, Sep. 22-24, 2006, pp. 1 to 4.
Sumei Sun, et al., "A Novel Iterative Receiver for Coded MIMO OFDM Systems", IEEE Communications Society, vol. 4, Jun. 20-24, 2004, pp. 2473 to 2477.

* cited by examiner

*Primary Examiner* — Ricky Ngo
*Assistant Examiner* — Chandrahas Patel
(74) *Attorney, Agent, or Firm* — Oblon, Spivak, McClelland, Maier & Neustadt, L.L.P.

(57) ABSTRACT

A communication apparatus includes: a transmitter having a plurality of transmitting units configured to perform data transmission, each transmitting unit including a synchronization unit configured to synchronize the transmitting units, an STBC test unit configured to divide an input signal to produce a plurality of STBC signals in order to perform an STBC test, and a controlling unit configured to perform a setting to test mode, wherein in the test mode, the transmitting units are combined to allow transmission of an STBC signal; and a receiver capable of receiving the STBC signal.

11 Claims, 9 Drawing Sheets

COMMUNICATION APPARATUS

CROSS-REFERENCE TO RELATED APPLICATION

This application is based upon and claims the benefit of priority from the prior Japanese Patent Application No. 2008-143005 filed in Japan on May 30, 2008; the entire contents of which are incorporated herein by reference.

BACKGROUND OF THE INVENTION

1. Field of the Invention

The present invention relates to a communication apparatus using space time coding for information communication, and more particularly to a communication apparatus configured to transmit or receive a space time code to test the receiving state of a receiver.

2. Description of Related Art

For a wireless communication system such as a mobile phone system, as a technique of raising the transmission rate without widening the frequency range, there is MIMO (Multiple Input Multiple Output) transmission that performs spatial multiplexing transmission using multiple transmitting and receiving antennas. For this MIMO transmission, in order to achieve a satisfactory diversity effect, signal points must be disposed per time and per transmitting antenna efficiently without lowering the coding rate excessively. Such signal point arranging method is called Space Time Coding (hereinafter, "STC" for short). As a typical space time coding, there is Space-Time Block Code (hereinafter, "STBC" for short). With a single receiving antenna, this technique can achieve a maximum transmit diversity effect equivalent to the maximum ratio composition.

With regard to STBC being a typical approach using STC, the following related art document (1) is known.

(1) A simple transmit diversity technique for wireless communication

S. Alamouti;

IEEE J. Select, Areas Commun., vol. 16, no. 8, pp. 1451-1458, October 1998.

According to the approach described in the document, a receiver can perform symbol separation by use of a simple linear calculation with respect to encoding by a transmitter, and also a maximum transmit diversity effect equivalent to the maximum ratio composition can be achieved. There are many applications of the approach, and there are many approaches for performance improvement when the number of antennas is greater than two; with regard to these approaches, there are the following related art documents, for example.

(2) Cyclic Space-Time Block Codes and Decoding Algorithm in MIMO CDMA System

Fu Hong-Hang; Feng Guang-zeng;

Wireless Communications, Networking and Mobile Computing, 2006. WiCOM 2006.

International Conference on 22-24 Sep. 2006 Page(s): 1-4

(3) A novel iterative receiver for coded MIMO OFDM systems

S. Sun, Y. Wu, Y. Li and T. T. Tjhung;

IEEE ICC 2004, pp. 2473-2477, vol. 4, June 2004.

Various combinations can be used in terms of the number of antennas of a transmitter or a receiver. According to the related art, however, no consideration has been given to mounting of LSI. For example, assume that there is demand that an STBC signal transmitted actually from an LSI is received and decoding of the STBC signal needs to be tested. However, when only an LSI of SISO (Single Input Single Output) based on wireless standard IEEE802.11n (hereinafter, "11n" for short) is arranged, the STBC signal test cannot be performed. Further, additional installation of a transmitter for the testing increases the cost. Thus, there is a need for an approach by which, in testing the transmitting and receiving state of the STBC signal, a change can be flexibly done to any configuration in terms of the increase and decrease of the number of antennas and the like, and the testing of the transmitting and receiving state can be implemented using an existing LSI chip.

BRIEF SUMMARY OF THE INVENTION

A communication apparatus according to an aspect of the present invention includes: a transmitter having a plurality of transmitting units configured to perform data transmission, each transmitting unit including a synchronization unit configured to synchronize the transmitting units, an STBC test unit configured to divide an input signal to produce a plurality of STBC signals in order to perform an STBC test, and a controlling unit configured to perform a setting to test mode, wherein in the test mode, the transmitting units are combined to transmit an STBC signal; and a receiver configured to receive the STBC signal.

A communication apparatus according to another aspect of the present invention includes: a transmitter including a transmitting unit configured to receive a first and second signals of at least two types, and firstly divide the first signal into a predetermined number of STBC signals and combine a predetermined number of the STBC signals being the result of the division and transmit the STBC signals as a first composite signal and subsequently divide the second signal into a predetermined number of STBC signals and combine a predetermined number of the STBC signals being the result of the division and transmit the STBC signals as a second composite signal; and a receiver including a receiving unit configured to receive, in a time series order, at least the first and second composite signals sequentially transmitted from the transmitter and thereafter process a predetermined number of the STBC signals for each of the first and second composite signals and thereby perform decoding to reproduce at least the first and second original signals.

DETAILED DESCRIPTION OF THE INVENTION

Embodiments of the present invention will be described with reference to the drawings.

First Embodiment

Figure 1:
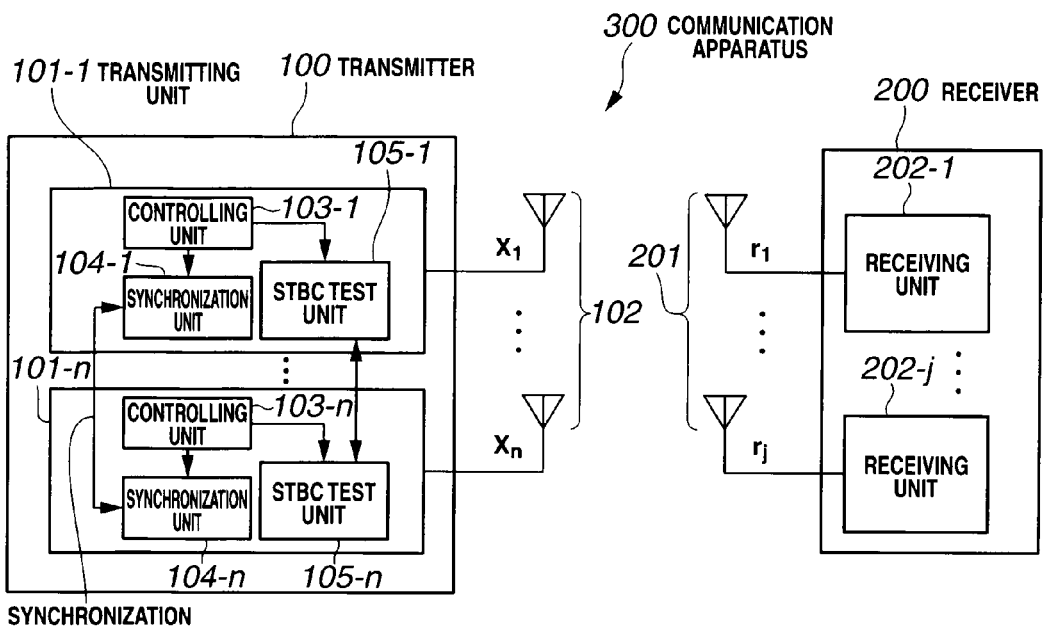
FIG. 1 is a block diagram illustrating a communication apparatus according to a first embodiment of the present invention.

FIG. 1 is a block diagram illustrating a communication apparatus according to a first embodiment of the present invention.

Referring to FIG. 1, a communication apparatus 300 includes a transmitter 100 configured to transmit an STBC signal and an STBC receiver 200 configured to receive the transmitted STBC signal. The transmitter 100 includes an n-number of transmitting units 101-1 to 101-n.

The transmitting units 101-1 to 101-n each include an m-number of antennas 102, synchronization units 104-1 to 104-n configured to synchronize the transmitting units, STBC test units 105-1 to 105-n configured to test transmitting and receiving of the STBC signal, and controlling units 103-1 to 103-n configured to perform a setting to ordinary mode or test mode and also determine a mode. Here, typically, the n-number of transmitting units 101-1 to 101-n each have an m-number of antennas, so the number of antennas is n×m in the whole transmitter 100; but for simplification of explanation, m is set to 1 in FIG. 1 and reference numeral 102 denotes the n-number of antennas. More specifically, for example, the first transmitting unit 101-1 includes an m-number of antennas 102 (here, m=1 in FIG. 1), a synchronization unit 104-1, an STBC test unit 105-1 and a controlling unit 103-1; and the n-th transmitting unit 101-n includes an m-number of antennas 102 (here, m=1 in FIG. 1), a synchronization unit 104-n, an STBC test unit 105-n and a controlling unit 103-n. Consequently, the transmitting units 101-1 to 101-n each have ordinary mode and test mode; thus the transmitting units 101-1 to 101-n each can operate independently as a single LSI chip.

In test mode, the STBC test unit 105-1 (typically, 105-n) divides an input signal (not illustrated) into a predetermined number (usually equal to the number n of transmitting antennas) of signals and sends the resultant signals to the respective STBC test units of each transmitting unit and produces a signal obtained by modulating a carrier of the same frequency with a signal having added thereto complex conjugate data needed when a receiver side recombines the signals being the result of the division. The produced signals are sent from the respective transmitting units in a manner synchronized with each other.

The STBC receiver 200 is a related art MIMO receiver with a j-number of antennas 201. Thus, signals received via the j-number of antennas 201 are received by a j-number of receiving units 202-1 to 202-j, and an arithmetic processing unit (not illustrated) extracts from the j-number of receiving signals, the signals which are not yet subjected to the division, and rearranges the signals in the original order, whereby decoding is performed.

Figure 2A:
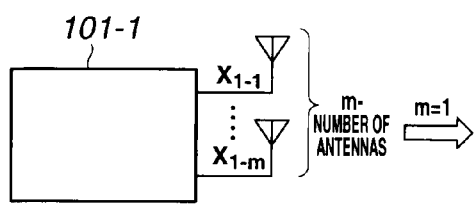
FIGS. 2A to 2D are each a view for describing an example of the number of antennas for each of the transmitting unit and the receiving unit of FIG. 1.
Figure 2B:
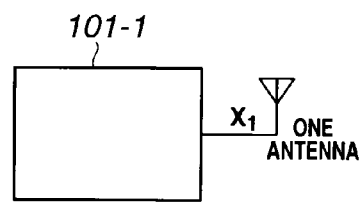

Here, as illustrated in FIG. 2A, the transmitting unit 101-1 is assumed to include an m-number of transmitting antennas. Typically, the transmitting units 101-2 to 101-n are each also assumed to include an m-number of antennas. Thus, in the case of a transmitter including an n-number of transmitting units 101-1 to 101-n, an n×m number of antennas are included in all. Referring to FIG. 1, for simplification of explanation, as illustrated in FIG. 2B, m is set to 1; thus, since the n-number of transmitting units each have one antenna, the whole transmitter 100 includes an n-number of antennas X1 to Xn in all.

Figure 2C:
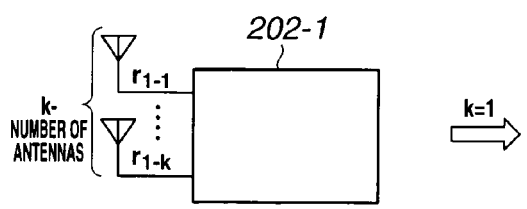
Figure 2D:
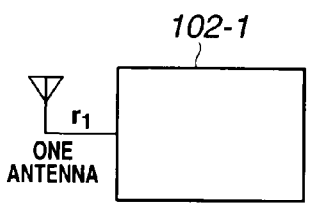

As illustrated in FIG. 2C, the receiving unit 202-1 is assumed to include a k-number of receiving antennas. Typically, the receiving units 202-2 to 202-j are each also assumed to include a k-number of antennas. Thus, in the case of a receiver including a j-number of receiving units 202-1 to 202-j, a j×k number of antennas are included in all. Referring to FIG. 1, for simplification of explanation, as illustrated in FIG. 2D, k is set to 1; thus, since the j-number of receiving units each have one antenna, the whole receiver 200 includes a j-number of antennas r1 to rj in all.

The operation of the communication apparatus 300 of FIG. 1 will be described.

In ordinary mode, only the related art data transmission is performed by each of the transmitting units 101-1 to 101-n; thus the controlling units 103-1 to 103-n, the synchronization units 104-1 to 104-n and the STBC test units 105-1 to 105-n don't operate. The expression "the related art data transmission" means, for example according to the above described wireless standard 11n, applying to an input signal, processings of convolution coding, interleaving, subcarrier modulation, inverse Fourier transform (IFFT), addition of guard interval and D/A conversion, and transmitting the processed signal. In the present embodiment, a case of 11n is described, but any communication system may be applied provided that STC can be used.

The operation in test mode will be described. In test mode, the transmitting units 101-1 to 101-n transmit STBC signals produced by the STBC test units 105-1 to 105-n in synchronization with the same synchronization timing of the synchronization units 104-1 to 104-n. Accordingly, an STBC signal can be transmitted using a given antenna. The transmitted signal is received via the antenna 201 of the STBC receiver 200 and then decoded.

An exemplary synchronization method will be described. Of the n-number of synchronization units 104-1 to 104-n, one synchronization unit produces a synchronization signal and sends the produced synchronization signal to the other synchronization units. The other synchronization units synchronize with each other in response to the synchronization signal. Here, the method is not limited to that of the present embodiment, and another approach may be applied provided that the transmitting units 101-1 to 101-n can transmit STBC signals in synchronization with each other.

Figure 3:
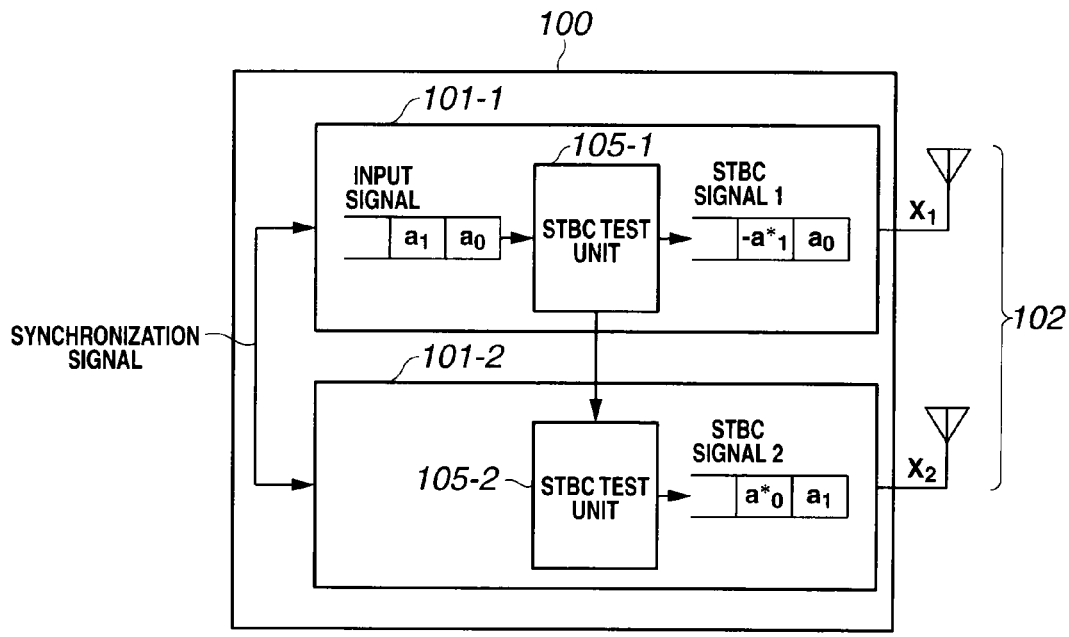
FIG. 3 is a view illustrating an exemplary operation of the transmitting unit when n=2 in FIG. 1.

FIG. 3 illustrates an exemplary operation of the transmitting units according to the first embodiment. FIG. 3 is a view illustrating an exemplary operation in which STBC signals are transmitted via X1 and X2 of the antenna 102 connected to the transmitting units, wherein the number n of transmitting units in FIG. 1 is 2 and the number m of antennas of the transmitting units is 1. Referring to FIG. 3, the controlling units 103-1 and 103-2 and synchronization units 104-1 and 104-2 are omitted in each of the transmitting units 101-1 and 101-2.

Input signal a0, a1 is inputted to the STBC test unit 105-1. In the STBC test unit 105, the input signal is divided into two signals a0 and a1, and data needed when the receiver side recombines the two signals is added to the two signals a0 and a1. Thereafter, the signals are outputted as an STBC signal 1 and an STBC signal 2. As the additional data required for the recombination, complex conjugate data is used (in FIG. 3, * indicates complex conjugate). In this case, in order to STBC-transmit the STBC signals 1 and 2 from the transmitting unit 101-1, two antennas are needed, but the transmitting unit 101-1 includes only one antenna. Thus, for the purpose of implementing STBC transmission, the STBC signal 2 is sent from the STBC test unit 105-1 of the transmitting unit 101-1 to the STBC test unit 105-2 of the other transmitting unit 101-2. Then, in synchronization with the same synchronization signal from the synchronization units 104-1 and 104-2, the STBC signal 1 is transmitted via X1 of the antenna 102 and the STBC signal 2 is transmitted via X2 of the antenna 102, whereby STBC transmission is performed.

In the present embodiment, a case of an STBC signal has been described. However, the same effect can also be achieved using another STC.

The related art required to understand the embodiment of the present invention will be described with reference to FIGS. 4 to 6.

Figure 4:
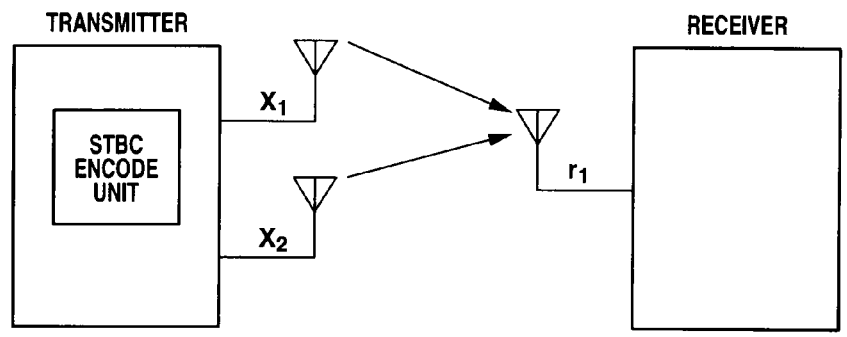
FIG. 4 is a view illustrating an example of MIMO technique.
Figure 5:
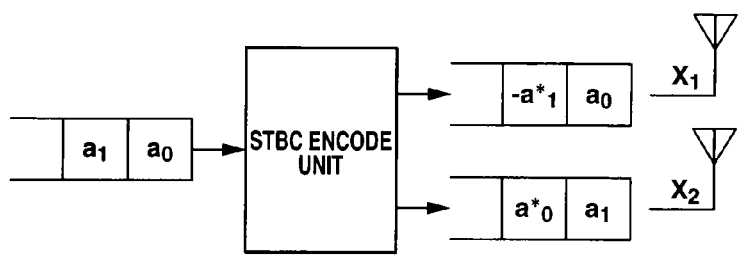
FIG. 5 is a view illustrating an STBC transmit image according to the MIMO technique.

FIG. 4 illustrates an example of MIMO technique and FIG. 5 illustrates an STBC transmit image according to the MIMO technique.

The transmitter includes, as illustrated in FIG. 4, an STBC encode unit and multiple (for example, two) antennas X1 and X2. When an input signal stream a0, a1 is, as illustrated in FIG. 5, inputted to the STBC encode unit, the input signal is divided into multiple (in this example, two) signal groups in a direction of time, and complex conjugate data −a*1 and a*0 are added to the signals a0 and a1, respectively. Thereafter, carriers of the same frequency are separately modulated by the two signal data and transmitted via the antennas X1 and X2. In this case, two radio waves obtained by modulating carriers of the same frequency with the two signal data are transmitted via the two antennas X1 and X2 in a mixed manner. The receiver refers to the complex conjugate data of the signal data which are mixed in the received two radio waves and thereby performs decoding to obtain a signal stream similar to the original input signal.

Figure 6:
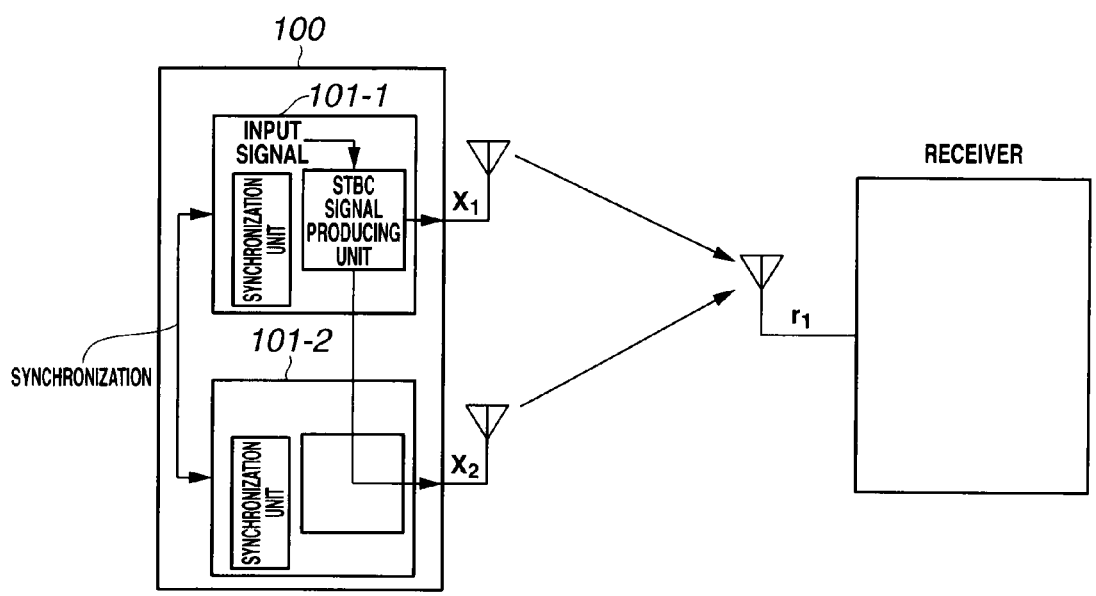
FIG. 6 is a view schematically illustrating the main part of the transmitting unit illustrated in FIG. 3.

FIG. 6 schematically illustrates the main part of the transmitter 100 illustrated in FIG. 3.

An STBC signal producing unit of FIG. 6 is included in the STBC test unit, and corresponds to an STBC encode unit and an STBC signal selecting unit to be described later.

Referring to FIG. 6, of the two signal data being the result of division by the STBC test unit of the transmitting unit 101-1, one is transmitted via the antenna X1 of the transmitting unit 101-1 and the other is transmitted via the antenna X2 of the transmitting unit 101-2. With this configuration, when two LSI chips with one antenna are combined and the transmitting units of the two chips are synchronized with each other, STBC signals can be transmitted. In this case, the number of transmitting antennas can be easily adapted to any condition solely by combining multiple chips with one antenna; thus labor and cost for manufacturing specific chips with multiple antennas can be saved.

Figure 7:
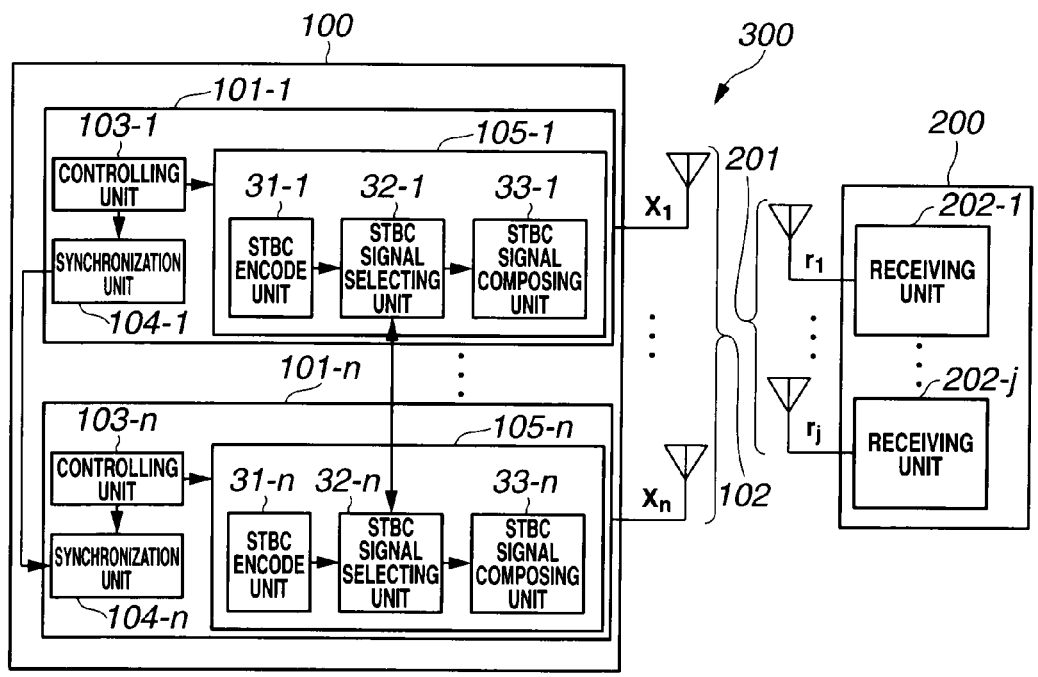
FIG. 7 is a block diagram illustrating an exemplary configuration of the STBC test unit of FIG. 1.

FIG. 7 illustrates an exemplary configuration of the STBC test units 105-1 to 105-n of FIG. 1.

Referring to FIG. 7, the STBC test units 105-1 to 105-n each include an STBC encode unit 31-1 to 31-n configured to produce an STBC signal, an STBC signal selecting unit 32-1 to 32-n configured to select and transmit a given STBC signal, and an STBC signal composing unit 33-1 to 33-n capable of combining a given STBC signal. More specifically, for example, the first STBC test unit 105-1 includes the STBC encode unit 31-1, the STBC signal selecting unit 32-1, and the STBC signal composing unit 33-1. Thus, the n-th STBC test unit 105-n includes the STBC encode unit 31-n, the STBC signal selecting unit 32-n, and the STBC signal composing unit 33-n.

The operation of the communication apparatus 300 of FIG. 7 will be described.

In test mode, one of the STBC encode units 31-1 to 31-n of the n-number of STBC test units 105-1 to 105-n produces an STBC signal. The STBC signal is produced, for example, by inputting test data to the STBC encode unit. That is, the STBC signal produced by one of the STBC test units 105-1 to 105-n can be outputted via the STBC signal selecting unit of that STBC test unit to one of the STBC signal composing unit of that STBC test unit and another STBC test unit, or to both the STBC signal composing unit of that STBC test unit and another STBC test unit. In this case, the determination on whether the STBC signal is to be outputted to one of the STBC signal composing unit of that STBC test unit and another STBC test unit, or to both the STBC signal composing unit of that STBC test unit and another STBC test unit is done by the controlling unit of the transmitting unit included in that STBC test unit. Further, the determination on which STBC test unit receives the STBC signal is also done by the controlling unit of the transmitting unit included in that STBC test unit. There is a technique by which the STBC test units 105-1 to 105-n are connected by cable to supply the STBC signal to the STBC test units. Accordingly, a given STBC signal can be outputted to a given STBC test unit. The STBC signal composing units 33-1 to 33-n perform pseudo channel composition with respect to an input signal. Thus, the use of more antennas than the actual number of antennas is implemented in a pseudo manner. The pseudo channel composition will be described later with reference to FIG. 8.

Referring to FIG. 7 according to the present embodiment, the STBC test units each include the STBC encode unit, the STBC signal selecting unit and the STBC signal composing unit. However, there is no need to include all the three circuit units, provided that an STBC signal can be transmitted. An exemplary method of producing an STBC signal has been described by which input data for testing is produced and then encoded by the STBC encode unit. However, another approach may be used provided that an STBC signal can be produced.

In this example, the STBC test units 105-1 to 105-n are connected by cable to supply an STBC signal. However, another approach may be used provided that a given STBC signal can be supplied to a given STBC test unit. When LSIs with the STBC test unit are combined, STBC signal transmission by a given number of antennas can be done.

Figure 8:
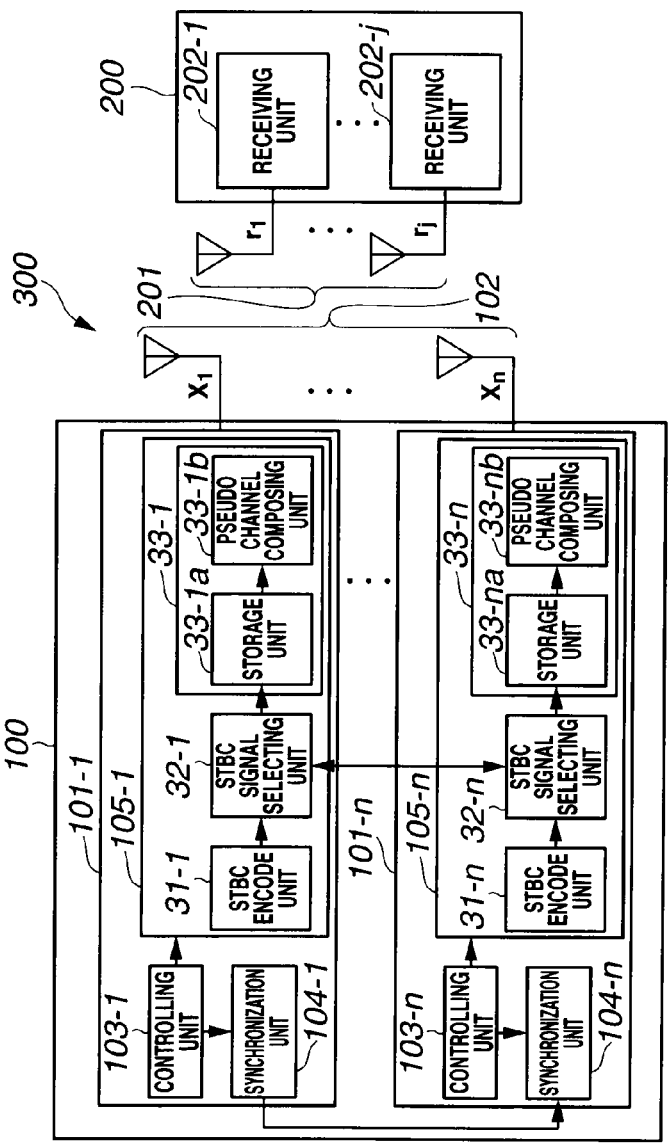
FIG. 8 is a block diagram illustrating an exemplary configuration of the STBC signal composing unit of FIG. 7.

FIG. 8 illustrates an exemplary configuration of the STBC signal composing units 33-1 to 33-n of FIG. 7.

Referring to FIG. 8, the STBC signal composing units 33-1 to 33-n each include a storage unit 33-1a to 33-na configured to store an STBC signal selected in the preceding stage, and a pseudo channel composing unit 33-1b to 33-nb that can perform pseudo channel composition with respect to the STBC signal stored in the storage unit in test mode. More specifically, for example, the first STBC signal composing unit 33-1 includes the storage unit 33-1a and the pseudo channel composing unit 33-1b. Consequently, the n-th STBC signal composing unit 33-n includes the storage unit 33-na and the pseudo channel composing unit 33-nb. With the configuration of the STBC signal composing units 33-1 to 33-n, even when the number m of antennas of the transmitting units 101-1 to 101-n is smaller than the number a of antennas (the number of input signal divisions) actually needed for STBC signal transmission (m<a), STBC signal transmission can be performed. Here, the expression "pseudo channel composition" means that pseudo channel composition is performed with respect to multiple STBC signals, whereby signals transmitted via multiple antennas in a pseudo manner are combined.

The operation in test mode will be described.

When m<a, an STBC signal selected (distributed) by the STBC signal selecting units 32-1 to 32-n is stored in the storage units 33-1a to 33-na of the transmitting units 101-1 to 101-n (or in one of the transmitting units 101-1 to 101-n). The STBC signals supplied to the storage units 33-1a to 33-na are supplied to the pseudo channel composing units 33-1b to 33-nb to perform pseudo channel composition. In this case, when the STBC signals can be sent in a manner synchronized with each other, the storage units 33-1a to 33-na may be omitted. Consequently, even when the actual number of antennas is smaller than a, an operation can be implemented in which an STBC signal is transmitted via an a-number of antennas in a pseudo manner.

According to the first embodiment, multiple existing chips (for example, 11n SISO chip) with one antenna are synchronized with each other in a coordinated manner, whereby the number of antennas can be increased for STBC signal transmission, allowing low-cost design.

In STBC test, for example, when it is desired to increase the number of antennas, the transmitter and the receiver must be reconstructed. According to the present embodiment, however, the configuration can be flexibly modified to address the above problem and STBC signal transmission can be done with a given number of antennas. Since multiple transmitting units are combined to constitute a transmitter, STBC signal transmission can be done with a given number of antennas, so that the cost for test circuit reconstruction can be saved. A test function is added to an existing transmitter/receiver, whereby a test using STBC can be performed with a given number of antennas. Accordingly, the effect of design cost reduction is achieved.

A given number of STBC signals are produced in the transmitter and pseudo channel composition is performed with respect to the STBC signals, whereby even when a needed number (a) of antennas is not provided, a composite STBC signal equivalent to when an a-number of antennas is provided can be transmitted. This contributes to miniaturization and cost reduction of the test circuit.

Second Embodiment

Figure 9:
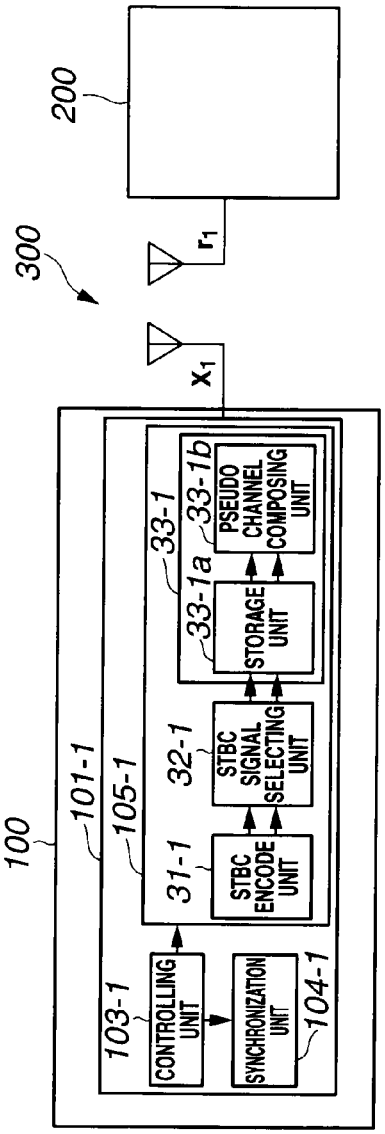
FIG. 9 is a block diagram illustrating a communication apparatus according to a second embodiment of the present invention.

FIG. 9 illustrates a block diagram of a communication apparatus according to a second embodiment of the present invention.

This exemplary configuration corresponds to a case in which the transmitter 100 of FIG. 8 includes only one transmitting unit 101-1 with one antenna X1. More specifically, this is an exemplary configuration in which two STBC signals being the result of division can be transmitted only via the one antenna X1 equivalently to when the two STBC signals are transmitted via two antennas.

Figure 10:
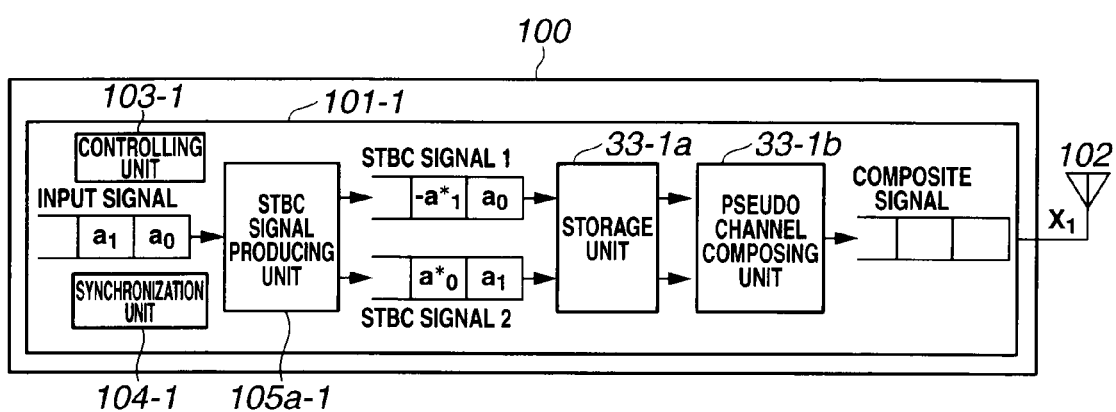
FIG. 10 is a view illustrating an exemplary operation of the transmitting unit of FIG. 9.

FIG. 10 illustrates an exemplary operation of the transmitting unit 101-1.

An input signal is divided into two signals by an STBC signal producing unit 105a-1 in an STBC test unit 105-1, and complex conjugate data is added to the two signals to form an STBC signal 1 and an STBC signal 2. The STBC signal producing unit 105a-1 includes an STBC encode unit 31-1 and an STBC signal selecting unit 32-1; the STBC signal selecting unit 32-1 sends to a storage unit 33-1a, the two STBC signals 1 and 2 being STBC signals produced by the preceding-stage STBC encode unit 31-1. The two STBC signals 1 and 2 are stored in respective storage areas of the storage unit 33-1a and then supplied to a pseudo channel composing unit 33-1b in a manner synchronized with each other. The pseudo channel composing unit 33-1b outputs a composite signal of the two STBC signals 1 and 2. Thereafter, a carrier is modulated with the composite signal and transmitted via X1 of an antenna 102.

Figure 11:
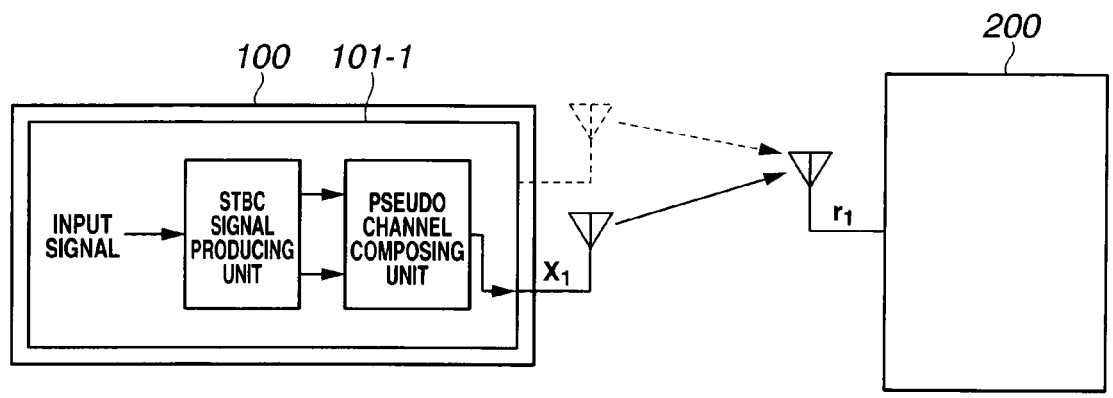
FIG. 11 is a view illustrating an STBC transmit image according to a pseudo-channel composing technique by the transmitting unit of FIG. 9.

Referring to FIG. 10, the transmitter side performs pseudo channel composition using one existing chip with one antenna, and the one antenna is used as multiple antennas in a pseudo manner, whereby STBC signal transmission can be performed. In order to transmit STBC signals 1 and 2, two antennas must be used; but according to the present embodiment, the transmission can be done with one antenna X1. More specifically, only one antenna is, as illustrated in FIG. 9, actually provided, but an operation can be performed in a pseudo manner, in which STBC signal transmission is, as illustrated in FIG. 11, performed via two antennas (indicated by the solid and broken lines).

In the present embodiment, an example has been described in which the transmitter 100 includes one transmitting unit with one antenna. However, a configuration may be used in which the transmitter 100 includes a given number of transmitting units equivalent to that of FIG. 9. In this case, an input signal to the multiple transmitting units may be supplied from another transmitting unit.

Figure 12:
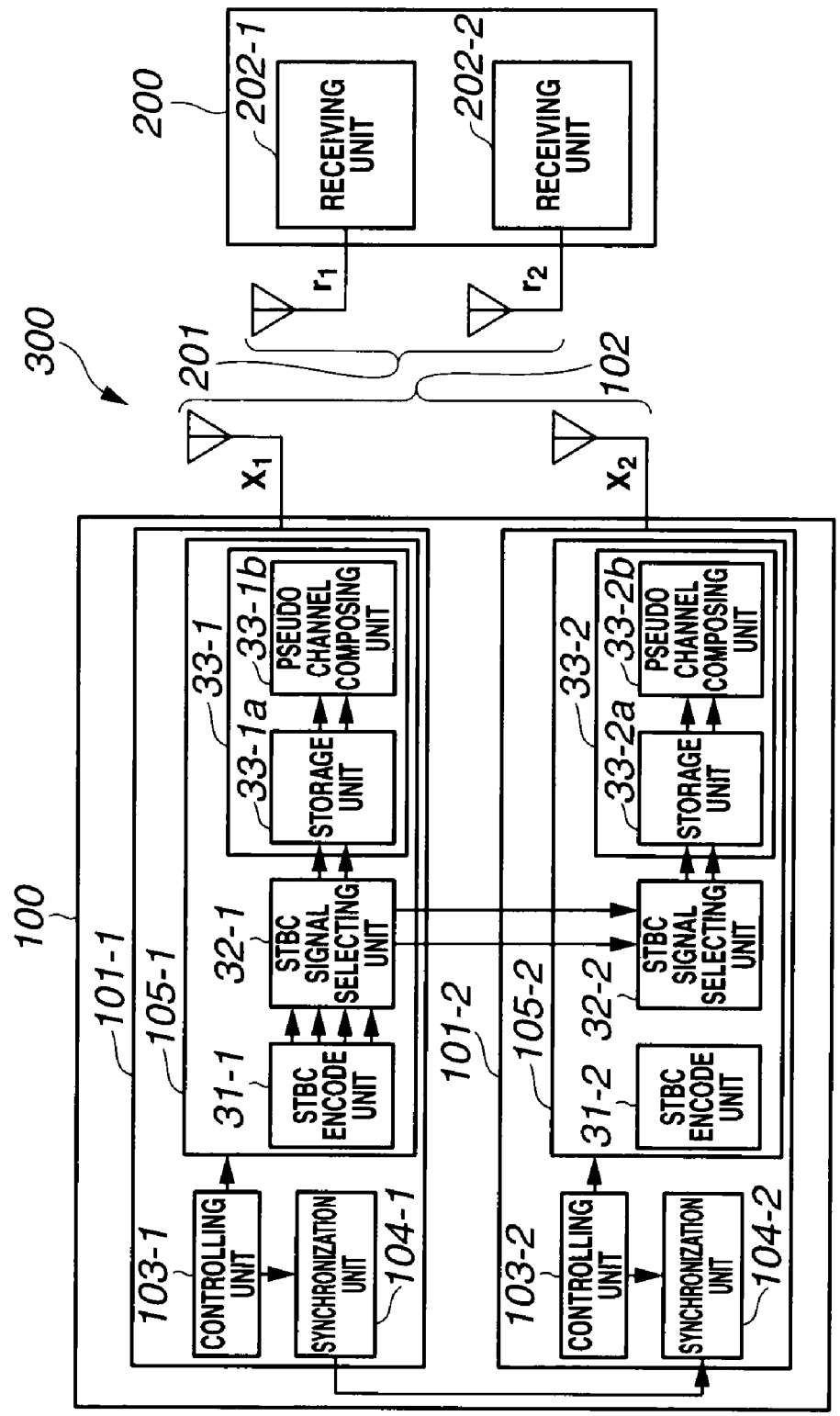
FIG. 12 is a view illustrating an exemplary configuration of the communication apparatus when two transmitting units of FIG. 9 are used.

FIG. 12 illustrates a configuration of a transmitter 100 which includes two transmitting units with one antenna illustrated in FIG. 9.

This exemplary configuration corresponds to a case in which the transmitter 100 of FIG. 8 includes two transmitting units 101-1 and 101-2 with one antenna X1. More specifically, this is an exemplary configuration in which four STBC signals being the result of division can be transmitted via the two antennas X1 and X2 included in the two transmitting units 101-1 and 101-2 equivalently to when the four STBC signals are transmitted via four antennas. Referring to FIG. 12, a receiver 200 includes two receiving units 202-1 and 202-2; but the receiver 200 may include only one receiving unit 202-1.

Figure 13:
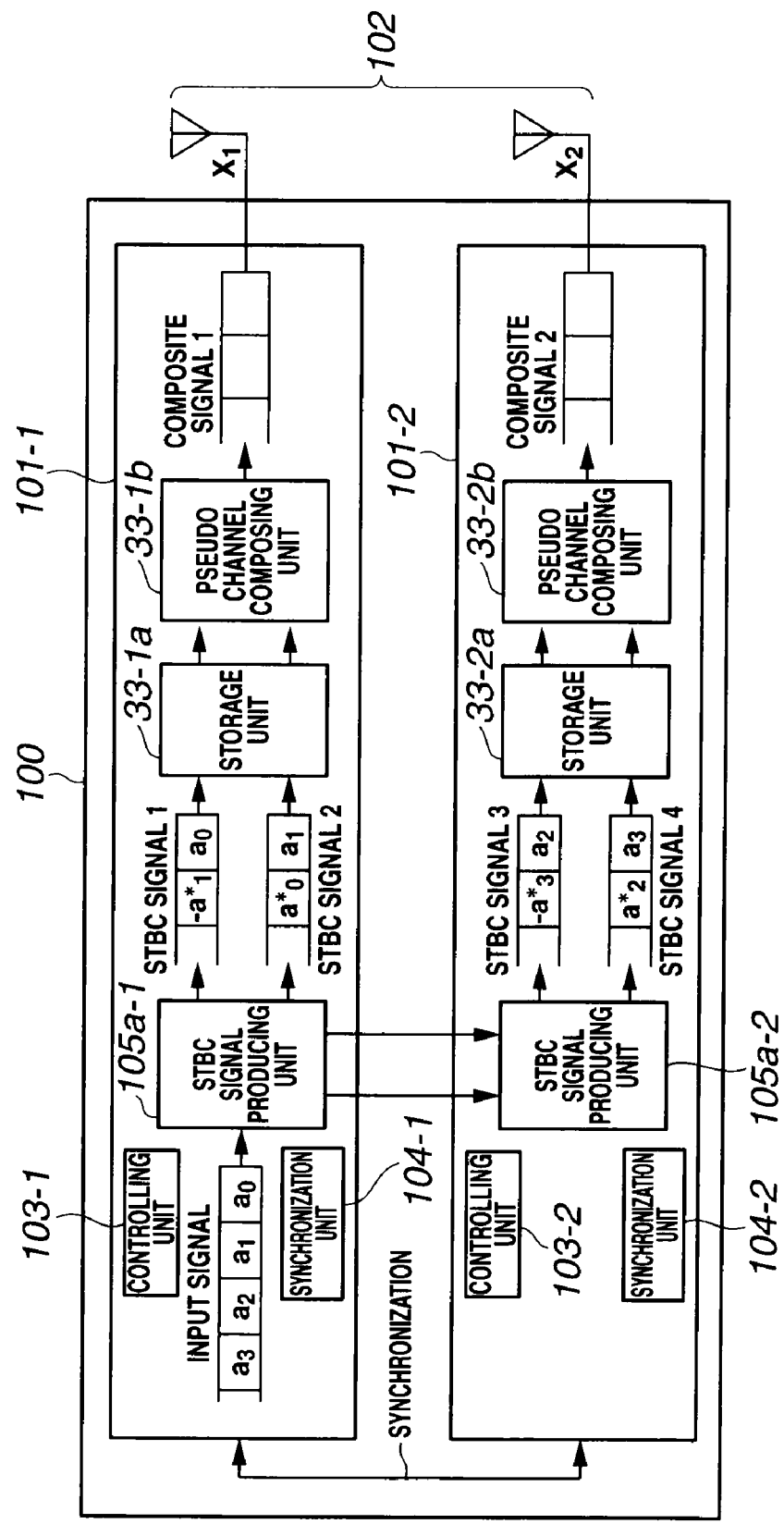
FIG. 13 is a view illustrating an exemplary operation of the two transmitting units of FIG. 12.

FIG. 13 illustrates an exemplary operation of the transmitter 100 including two transmitting units 101-1 and 101-2.

An input signal is divided into four signals by an STBC signal producing unit 105a-1 in an STBC test unit 105-1, and complex conjugate data is added to the four signals to form STBC signals 1 and 2 and STBC signals 3 and 4. The STBC signal producing unit 105a-1 includes an STBC encode unit 31-1 and an STBC signal selecting unit 32-1; the STBC signal selecting unit 32-1 sends to a storage unit 33-1a, STBC signals 1 and 2 of the four STBC signals 1 to 4 being STBC signals produced by the preceding-stage STBC encode unit 31-1, and sends STBC signals 3 and 4 via an STBC signal producing unit 105a-2 in another transmitting unit 101-2 to a storage unit 33-2a. The two STBC signals 1 and 2 are stored in respective storage areas of the storage unit 33-1a and then supplied to a pseudo channel composing unit 33-1b in a manner synchronized with each other. The two STBC signals 3 and 4 are stored in respective storage areas of the storage unit 33-2a and then supplied to a pseudo channel composing unit 33-2b in a manner synchronized with each other. The pseudo channel composing unit 33-1b outputs a first composite signal 1 of the two STBC signals 1 and 2; and the pseudo channel composing unit 33-2b outputs a second composite signal 2 of the two STBC signals 3 and 4. Thereafter, a carrier of a prescribed frequency is modulated with the first composite signal 1 and transmitted via X1 of an antenna 102; and a carrier of the same frequency as that of X1 is modulated with the second composite signal 2 and transmitted via X2 of the antenna 102.

Figure 14:
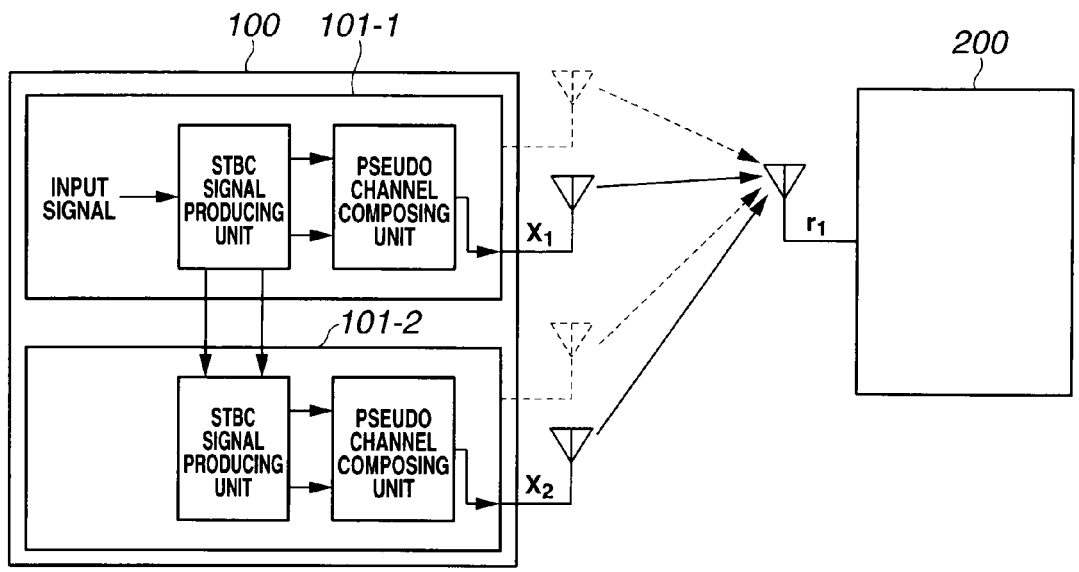
FIG. 14 is a view illustrating an STBC transmit image according to the pseudo-channel composing technique by the two transmitting units of FIG. 12.

Referring to FIG. 13, in order to transmit STBC signals 1, 2, 3 and 4, four antennas must be used; but according to the present embodiment, the transmission can be done with two antennas X1 and X2. More specifically, only two antennas are, as illustrated in FIG. 12, actually provided, but an operation can be performed in a pseudo manner, in which STBC signal transmission is, as illustrated in FIG. 14, performed via four antennas (indicated by the solid and broken lines).

The present approach can be applied to other cases irrespective of the number of signals subjected to pseudo channel composition, the number of antennas and the type of STC. For example, even when the number of transmitting units is one, the STBC signal producing unit 105a-1 divides an input signal into three or more signals and adds to the signals complex conjugate data needed when the receiver side recombines the signals and thereby produces multiple STBC signals, whereby the number of signals subjected to pseudo channel composition can be set to three or more.

According to the second embodiment, using a chip with only one antenna, multiple STBC signals are produced and subjected to pseudo channel composition, whereby a pseudo transmitter with multiple transmitting antennas can be constructed. Further, when the number of antennas is increased to two or more using multiple chips, a pseudo transmitter with many transmitting antennas can be constructed.

Third Embodiment

Figure 15:
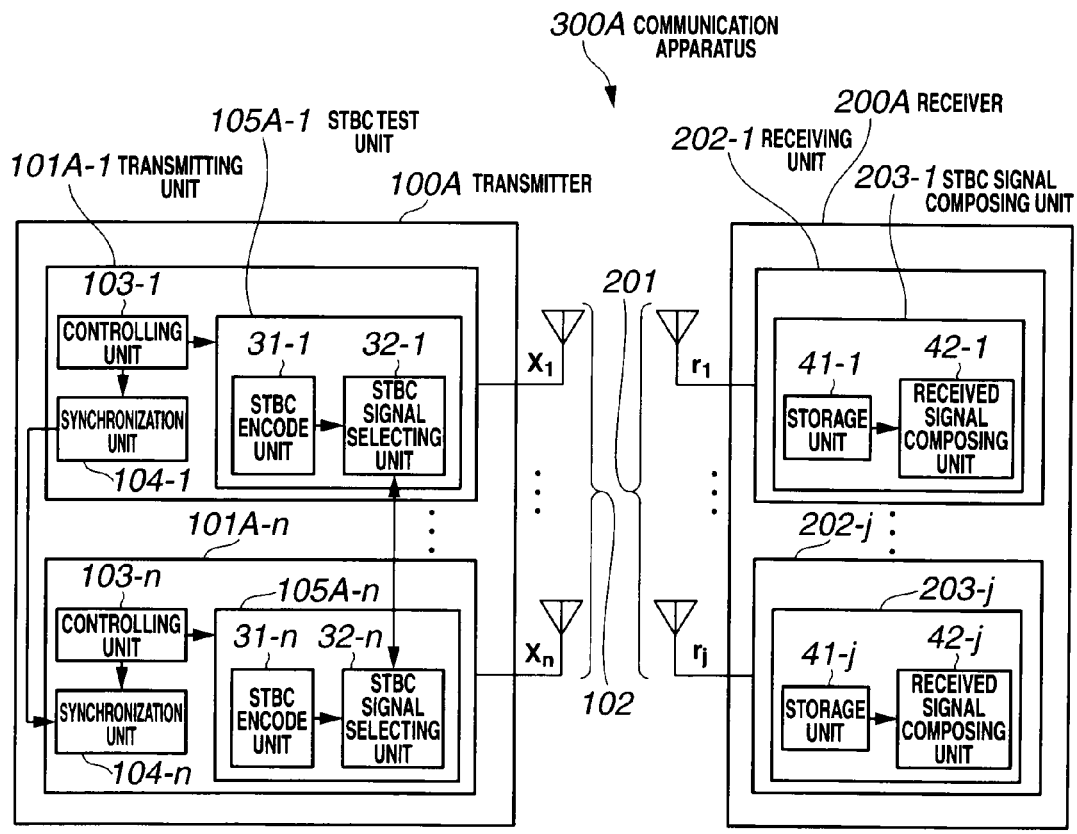
FIG. 15 is a block diagram illustrating a communication apparatus according to a third embodiment of the present invention.

FIG. 15 illustrates a block diagram of a communication apparatus according to a third embodiment of the present invention. The same reference numerals are applied to parts corresponding to those of FIG. 7, and an explanation thereof is omitted.

A communication apparatus 300A illustrated in FIG. 15 includes a transmitter 100A and an STBC receiver 200A. The difference from the communication apparatus 300 of FIG. 7 lies in that STBC test units 105A-1 to 105A-n in an n-number of transmitting units 101A-1 to 101A-n in the communication apparatus 300A of FIG. 15 each include only an STBC signal producing unit constituted of an STBC encode unit 31-1 to 31-n and an STBC signal selecting unit 32-1 to 32-n; an STBC signal composing unit 33-1 to 33-n is omitted. Further, a j-number of receiving units 202-1 to 202-n in the STBC receiver 200A each include a storage unit 41-1 to 41-j and a received signal composing unit 42-1 to 42j.

In the transmitting units 101A-1 to 101A-n, there are an m×n number (in FIG. 15, m=1 for simplification of explanation) of antennas 102, controlling units 103-1 to 103-n, synchronization units 104-1 to 104-n, and STBC test units 105A-1 to 105A-n. The STBC test units 105A-1 to 105A-n each include the STBC encode unit 31-1 to 31-n and the STBC signal selecting unit 32-1 to 32-n. More specifically, the first STBC test unit 105A-1 includes the STBC encode unit 31-1 and the STBC signal selecting unit 32-1. Typically, the n-th STBC test unit 105A-n includes the STBC encode unit 31-n and the STBC signal selecting unit 32-n.

In the j-number of receiving units 202-1 to 202-j, there are a k×j number (in FIG. 15, k=1 for simplification of explanation) of antennas 201, and STBC signal composing units 203-1 to 203-j. The STBC signal composing units 203-1 to 203-j each include the storage unit 41-1 to 41-j and the received signal composing unit 42-1 to 42-j. More specifically, the first STBC signal composing unit 203-1 includes the storage unit 41-1 and the received signal composing unit 42-1. Typically, the j-th STBC signal composing unit 203-j includes the storage unit 41-j and the received signal composing unit 42-j.

The operation in test mode will be described.

When the number m of antennas is smaller than the number a of antennas actually needed (m<a), the transmitting units 101A-1 to 101A-n each send STBC signals in a time multiplexed manner so that the total number of times is a. The receiving units 202-1 to 202-j each receive the STBC signals (a−1)-number of times and store the STBC signals in the storage units 41-1 to 41-j. After the (a−1) number of signals have been stored, the signals are supplied to the received signal composing units 42-1 to 42-j. The last one STBC signal is supplied directly to the received signal composing units 42-1 to 42-j. Then, the received signal composing units 42-1 to 42-j combine the STBC signals stored in the storage units 41-1 to 41-j and the last one STBC signal in an original order, i.e., in a time series order and output the resultant signal. Accordingly, the areas of the storage units 41-1 to 41-j used for one reception can be saved.

The present embodiment can contribute to circuit area reduction, compared to when the transmitter side performs pseudo channel composition. The reason for this is as follows: According to the second embodiment, calculation of pseudo channel composition is needed; but according to the third embodiment, the received signal composing units 42-1 to 42-j only combine the signals stored in the storage units 41-1 to 41-j and the last one signal in a time series order, so the amount of calculation is reduced.

Figure 16:
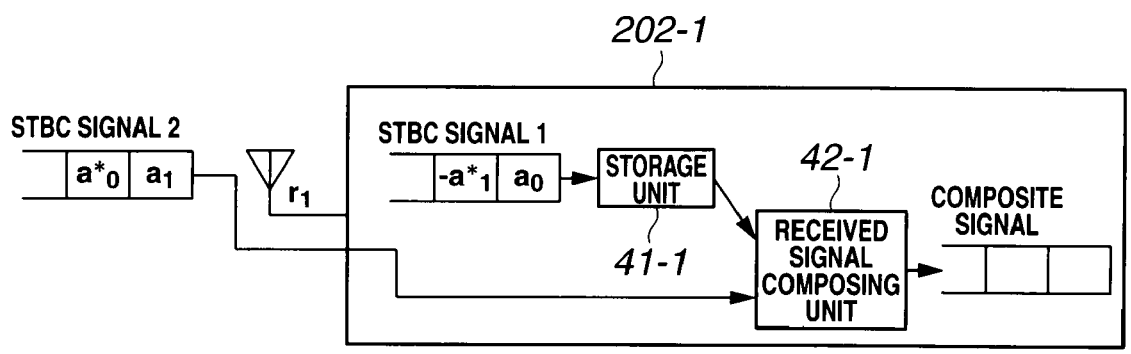
FIG. 16 is a view illustrating an exemplary operation of the receiving unit of FIG. 15.

FIG. 16 illustrates an exemplary operation of the receiving unit 202-1 of FIG. 15 according to the third embodiment.

The operation of the receiving unit receiving two STBC signals transmitted in a time multiplexed manner will be described with regard to the present embodiment. Firstly the STBC signal 1 received via an antenna r1 is stored in the storage unit 41-1. Thereafter, the STBC signal 2 sent in a time multiplexed manner is supplied directly to the received signal composing unit 42-1, and the STBC signal 1 stored in the storage unit 41-1 is supplied to the received signal composing unit 42-1 in a manner synchronized with the STBC signal 2. When receiving STBC signals 1 and 2, the received signal composing unit 42-1 outputs a composite signal.

In the present embodiment, a case has been described in which the number of signals is 2 (a=2). However, a can be set to any value. The present approach can be applied irrespective of the number of signals subjected to composition, the number of antennas and the type of STC.

According to the third embodiment, multiple STBC signals are transmitted in a time multiplexed manner, and the STBC signals are stored in the receiver side, and thereafter signal composition is performed in the receiver side. Pseudo channel composition is not performed in the transmitter side as with the second embodiment and received signals are combined in a time series order in the receiver side. Accordingly, the third embodiment can contribute to simplification of calculation and circuit area reduction, compared to the second embodiment.

A configuration may also be used to which both the second embodiment and the third embodiment are applied. For example, in the examples of FIGS. 9 to 11, of two types of signals A and B to be sent, firstly a signal A is divided into two signals by an STBC signal producing unit, and the two signals obtained by the division are subjected to channel composition, and the resultant composite signal C is transmitted. Subsequently, a signal B is divided into two signals by the STBC signal producing unit, and the two signals obtained by the division are subjected to channel composition, and the resultant composite signal D is transmitted. In the receiver side, the two composite signals C and D transmitted in a time series order are, as illustrated in FIG. 16, received in a time multiplexed manner, and thereafter arithmetic processing is applied to each of the composite signals C and D to reproduce original signals A and B. In short, for example, two signals being the result of channel composition are transmitted sequentially (in a time multiplexed manner) from the transmitter side and then received sequentially by the receiver side, whereby four signals can be transmitted by two transmitting operations and then received and decoded. Here, two types of signals A and B are inputted; but two or more types of signals may be inputted. Further, in this example, each signal is divided into two signals; but each signal may be divided into two or more signals.

According to the present invention described above, in a communication apparatus using Spacing Time Coding (STC), when a test function is added to an existing transmitter/receiver, STC transmitting/receiving test of any order can be performed. Mounting of a test function allows a test using STC with a given number of antennas without designing a communication apparatus for each STC order or each of the needed numbers of antennas. Accordingly, design cost reduction can be achieved.

Consequently, when a receiver is tested with respect to a transmitter of a given configuration, flexible design can be achieved. Further, at least a part of an existing LSI can be used, so it is possible to provide a communication apparatus for which the cost for testing the transmitting and receiving state can be reduced.

Having described the embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

What is claimed is:

1. A communication apparatus comprising:
a transmitter having a plurality of transmitting units configured to perform data transmission, each transmitting unit including a synchronization unit configured to synchronize the transmitting units, an Space-Time Block Code (STBC) test unit configured to divide an input signal to produce a plurality of STBC signals in order to perform an STBC test, and a controlling unit configured to perform a setting to a test mode, wherein in the test mode, the transmitting units are combined to transmit an STBC signal; and
a receiver configured to receive the STBC signal,
wherein, in the test mode, the STBC test unit divides an input signal into a predetermined number of signals, and produces the predetermined number of STBC signals having added thereto complex conjugate data needed when a receiver side recombines the STBC signals being the result of the division, and the predetermined number of STBC signals are simultaneously transmitted in a manner synchronized with each other from the plurality of the transmitting units via respective STBC test units of the transmitting units.

2. The communication apparatus according to claim 1,
wherein the STBC test unit includes:
an STBC encode unit configured to produce a plurality of STBC signals from an input signal;
an STBC signal selecting unit configured to select and transmit an STBC signal from among the plurality of STBC signals; and
an STBC signal composing unit configured to combine the selected STBC signals in test mode; and
wherein the STBC signal composing unit includes:
a storage unit configured to store the selected STBC signals; and
a pseudo channel composing unit configured to combine the STBC signals stored in the storage unit to perform pseudo channel composition in the test mode.

3. The communication apparatus according to claim 1,
wherein the STBC test unit includes:
a function that, in the test mode, divides an input signal into a predetermined number of signals, and produces the predetermined number of STBC signals having added thereto complex conjugate data needed when a receiver side recombines the STBC signals being the result of the division, and simultaneously transmits the predetermined number of STBC signals synchronized with each other from the plurality of the transmitting units via respective STBC test units of the transmitting units; and
a function that, in the test mode, divides an input signal into a predetermined number of signals, and produces the predetermined number of STBC signals having added thereto complex conjugate data needed when a receiver side recombines the STBC signals being the result of the division, and combines the predetermined number of STBC signals, and transmits the predetermined number of STBC signals from the transmitting unit.

4. The communication apparatus according to claim 1,
wherein the transmitter includes a transmitting unit configured to transmit a plurality of STBC signals in a time multiplexed manner, and
wherein the receiver includes a receiving unit that has a storage unit configured to store a received signal obtained by receiving a plurality of the STBC signals transmitted in a time multiplexed manner, and a receiving signal composing unit configured to combine the stored received signals in an original order in the test mode.

5. The communication apparatus according to claim 1,
wherein the transmitter includes a transmitting unit configured to transmit a predetermined number of STBC signals sequentially in a time multiplexed manner, and
wherein the receiver includes a receiving unit that has a storage unit configured to sequentially receive and store (the predetermined number—1)-number STBC signals when the predetermined number of STBC signals are received sequentially in a time multiplexed manner, and a received signal composing unit configured to receive the (the predetermined number—1)-number STBC signals stored in the storage unit in the test mode and at the same time directly receive a last one STBC signal not routed through the storage unit and combine the predetermined number of STBC signals in a time series order.

6. A communication apparatus comprising:
a transmitter including a transmitting unit configured to receive first and second signals of at least two types, and firstly divide the first signal into a predetermined number of Space-Time Block Code (STBC) signals and combine a predetermined number of the STBC signals being the result of the division and transmit the STBC signals as a first composite signal, and subsequently divide the second signal into a predetermined number of STBC signals and combine a predetermined number of the STBC signals being the result of the division and transmit the STBC signals as a second composite signal; and a receiver including a receiving unit configured to receive, in a time series order, at least the first and second composite signals sequentially transmitted from the transmitter and thereafter process a predetermined number of the STBC signals for each of the first and second composite signals and thereby perform decoding to reproduce at least the first and second original signals.

7. A communication apparatus comprising:

a transmitter having a plurality of transmitting units configured to perform data transmission, each transmitting unit including a synchronization unit configured to synchronize the transmitting units, an STBC test unit configured to divide an input signal to produce a plurality of STBC signals in order to perform an STBC test, and a controlling unit configured to perform a setting to a test mode, wherein in the test mode, the transmitting units are combined to transmit an STBC signal; and a receiver configured to receive the STBC signal, wherein, in the test mode, the STBC test unit divides an input signal into a predetermined number of signals, and produces the predetermined number of STBC signals having added thereto complex conjugate data needed when a receiver side recombines the STBC signals being the result of the division, and combines the predetermined number of STBC signals, and the STBC signals are transmitted from the transmitting unit.

8. The communication apparatus according to claim 7, wherein the transmitter includes a transmitting unit configured to transmit a plurality of STBC signals in a time multiplexed manner, and wherein the receiver includes a receiving unit that has a storage unit configured to store a received signal obtained by receiving a plurality of the STBC signals transmitted in a time multiplexed manner, and a receiving signal composing unit configured to combine the stored received signals in an original order in the test mode.

9. The communication apparatus according to claim 7, wherein the transmitter includes a transmitting unit configured to transmit a predetermined number of STBC signals sequentially in a time multiplexed manner, and wherein the receiver includes a receiving unit that has a storage unit configured to sequentially receive and store (the predetermined number—1)-number STBC signals when the predetermined number of STBC signals, are received sequentially in a time multiplexed manner, and a received signal composing unit configured to receive the (the predetermined number—1)-number STBC signals stored in the storage unit in the test mode and at the same time directly receive a last one STBC signal not routed through the storage unit and combine the predetermined number of STBC signals in a time series order.

10. The communication apparatus according to claim 7, wherein the STBC test unit includes:

an STBC encode unit configured to produce a plurality of STBC signals from an input signal;

an STBC signal selecting unit configured to select and transmit an STBC signal from among the plurality of STBC signals; and an STBC signal composing unit configured to combine the selected STBC signals in the test mode; and wherein the STBC signal composing unit includes:

a storage unit configured to store the selected STBC signals; and a pseudo channel composing unit configured to combine the STBC signals stored in the storage unit to perform pseudo channel composition in the test mode.

11. The communication apparatus according to claim 7, wherein the STBC test unit includes:

a function that, in the test mode, divides an input signal into a predetermined number of signals, and produces the predetermined number of STBC signals having added thereto complex conjugate data needed when a receiver side recombines the STBC signals being the result of the division, and simultaneously transmits the predetermined number of STBC signals synchronized with each other from the plurality of the transmitting units via respective STBC test units of the transmitting units; and a function that, in the test mode, divides an input signal into a predetermined number of signals, and produces the predetermined number of STBC signals having added thereto complex conjugate data needed when a receiver side recombines the STBC signals being the result of the division, and combines the predetermined number of STBC signals, and transmits the predetermined number of STBC signals from the transmitting unit.

* * * * *